Nov. 30, 1937. H. J. SCOTT 2,100,412
TEMPERATURE COMPENSATED DEVICE
Filed Feb. 9, 1935
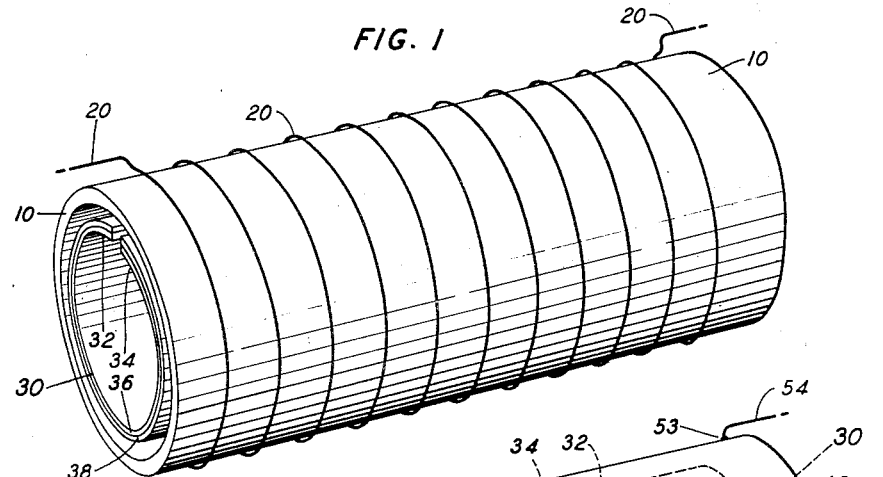
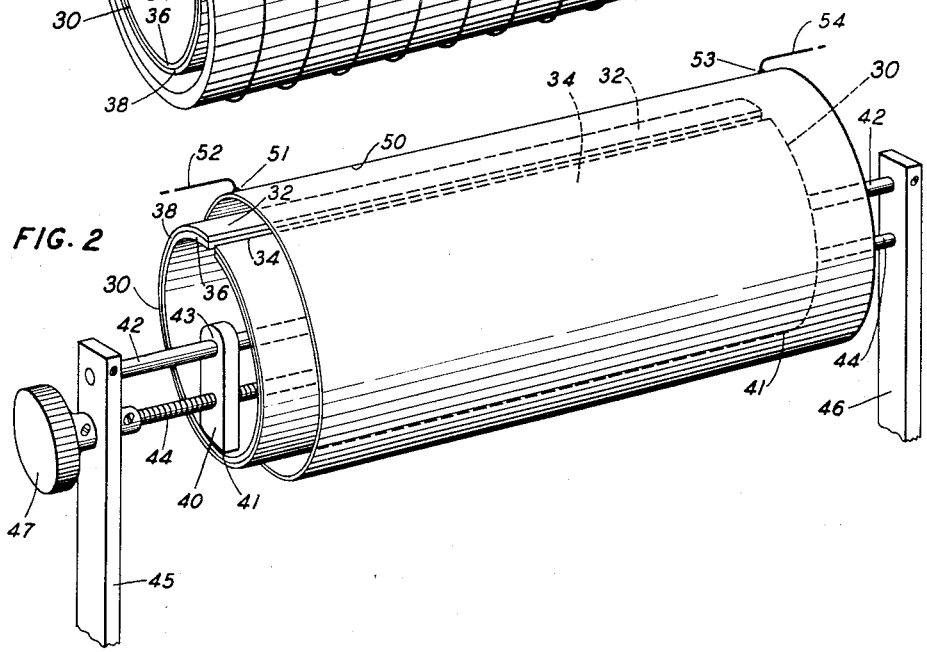
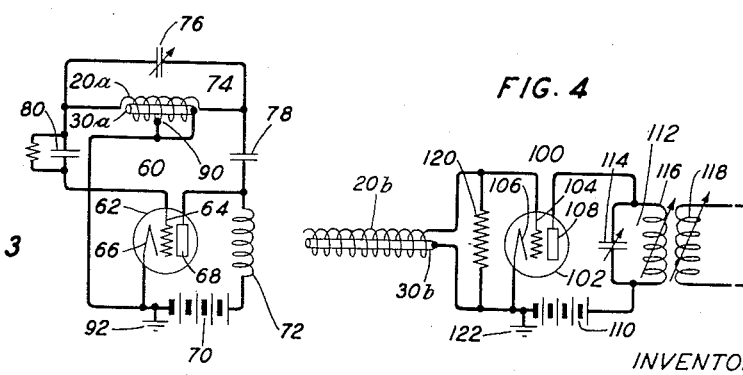
INVENTOR
H. J. SCOTT
BY W. J. O'Neill
ATTORNEY Patented Nov. 30, 1937

2,100,412

UNITED STATES PATENT OFFICE 2,100,412

TEMPERATURE-COMPENSATED DEVICE

Herbert J. Scott, Oakland, Calif., assignor to Bell Telephone Laboratories, Incorporated, New York, N. Y., a corporation of New York Application February 9, 1935, Serial No. 5,873

7 Claims. (Cl. 178—44)

This invention relates to temperature-compensated devices and, more particularly, to means compensating for impedance variations caused by temperature variations.

One of the objects of this invention is to control or stabilize the frequency of an oscillation generator.

Another object of this invention is to control or vary the capacity of an inductance coil or other impedance device in accordance with temperature changes.

Another object of this invention is to give to an electrical system a predetermined characteristic with temperature change.

An inductance coil or other electrical device when subjected to temperature change may, by change of its mechanical dimensions, alter its electrical properties or characteristics and hence change the thermal characteristics of a circuit or system with which it may be operatively connected or associated.

To compensate for such changes in electrical characteristics, means controlled by or responsive to temperature change may be provided in accordance with this invention to control or vary the distributed capacity and inductance of the device.

The device to be controlled may be for example, a metallic member in the form of a metal tube or in the form of a solenoidal inductance coil of a suitable number of turns of wire wound on a suitable coil form or other supporting and insulating means. The tube or coil may have, if desired, a critical length with respect to the wave-length of the system with which it may be associated.

The temperature responsive means may comprise a mechanically expansible metallic member in the form of a longitudinally split metallic cylinder of suitable length to vary the distributed capacity of the coil or tube with which it may be associated and composed of a metal or combination of metals having a temperature expansive characteristic different from that of the tube or coil and inserted within or external to the tube or coil and suitably spaced therefrom.

As the temperature is varied, the split metallic cylinder enlarges or contracts, thereby changing the spacing or distance separation between the coil or tube and the split cylinder and thereby changing the distributed capacity of the associated coil or tube system.

The split cylinder may conveniently be made in the bimetallic or multi-metallic form so that a positive, negative or zero change in capacity may be obtained as desired to suit the particular conditions and thereby give to the system a predetermined characteristic with temperature change.

The coil and its associated temperature responsive means may form part of a circuit as the tunable circuit of an oscillation generator to stabilize or fix at a constant value the frequency of the oscillations generated thereby irrespective of temperature variations.

The temperature compensating device may be associated with a wave conductor having characteristics properly related to the frequency or the wave-length of the waves or oscillations thereon. The wave conductor may be in the form of a solenoidal wave coil or, particularly in connection with the shorter wave-lengths, in the form of a straight tubular conductor of critical length with respect to the length of the waves developed thereon.

The wave coil and its associated temperature compensating means may be employed in connection with an oscillator to stabilize the frequency of oscillations in accordance with the wave coil frequency characteristic. Such arrangement having a sharp resonance characteristic and being temperature controlled may be utilized to perform a function similar to that of a zero temperature coefficient piezoelectric quartz crystal.

For a clearer understanding of the nature of this invention and the additional features and objects thereof, reference is made to the following description and accompanying drawing, in which Fig. 1 is a perspective view of a temperature-compensated inductance coil;

Fig. 2 is a view of a modification of Fig. 1;

Fig. 3 is a diagram of a temperature-compensated oscillator; and

Fig. 4 is a diagram of a temperature-compensated wave coil system of frequency stabilization.

Fig. 1 shows a cylindrical coil form 10 upon which is wound a solenoidal inductance coil 20. Within the coil 20 and the coil form 10, there is disposed an expansible metallic member in the form of a longitudinally split metallic cylinder 30 suitably supported spacially with respect to the coil 20 and the coil form 10, and having a length substantially equal to the length of the coil 20. The coil 20 may have any suitable length, diameter or other dimensions and any suitable number of turns of wire, as copper wire of appropriate size to suit the particular purpose of the circuit with which the coil 20 may be connected or associated.

The metallic cylinder 30 is preferably split longitudinally the entire length thereof as shown in Fig. 1 and also in Fig. 2 to form separated parts 32 and 34 which provide a high impedance path therebetween and also permit easy expansion and contraction of the metallic cylinder 30 with temperature change to thereby more easily vary the spacing between the cylinder 30 and the coil 20.

By longitudinally splitting the cylinder 30 into separated parts 32 and 34, the degree of inductive heating of the cylinder 30 is limited. It will be understood, however, that if desired the parts 32 and 34 may be connected by a flexible connection, as by a copper braid (not shown) along their length to form a short-circuited turn comprising the cylinder 30 and the copper braid and thereby influence the inductance characteristics of the device to a greater degree than if the parts 32 and 34 were non-conductively separated as shown in Figs. 1 and 2.

The split cylinder 30 may be constructed of a single metal having a different temperature expansive characteristic than that of the coil 20, thereby to control the distributed capacity of the coil 20 in accordance with change of temperature; or, the split cylinder 30 may be of bimetallic or multi-metallic form. In the bimetallic form, there may be two split cylinders 36 and 38 of equal length and composed of different metals, such as brass and nickel, having different temperature coefficients of expansion, one of the cylinders 36 being disposed within or inside the other cylinder 38 and secured thereto. If the metal cylinder having the higher temperature coefficient of expansion, as the brass cylinder, is arranged on the outside as at 38, the nickel cylinder being on the inside as at 36, then upon an increase of temperature the separated parts 32 and 34 of the split cylinder 30 are caused to flex inwardly and approach each other thereby increasing the spacing between the cylinder 30 and the coil 20 and reducing the distributed capacity of the coil 20. But, if the parts be reversed and the brass cylinder be disposed within or inside of the nickel cylinder, then upon an increase of temperature the separated parts 32 and 34 of the metallic cylinder 30 are caused to flex outwardly and away from each other, thereby decreasing the spacing between the cylinder 30 and the coil 20 and increasing the distributed capacity of the coil 20. Accordingly, the bimetallic cylinder 30 may be arranged to obtain in accordance with temperature change a positive, negative or zero change in capacity of the coil 20, and may be adjusted to compensate for changes in the characteristics of the coil system or circuit in which it may be connected.

The dimensions including the length of the cylinder 30 along the axis of the system are such as to provide an area therein sufficient to vary the capacity of the coil 20 or other conductor such as the metallic tube 50 of Fig. 2 with which it may be electrostatically associated whereby upon change of temperature the capacity of the coil 20 or tube 50 is varied in accordance with the temperature change.

The temperature compensating cylinder 30 of Figs. 1 or 2 is suitably supported internally or externally with respect to the coil 20 or tube 50. The support means may be for example, in the form shown in Fig. 2 wherein a pair of brackets 40 secured at 41 to each end of the cylinder 30 are slidable longitudinally at 43 on a stationary rod 42 by means of a rotatable lead screw 44 supported by members 45 and 46 and turned by a control knob 47 to adjust the distributed capacity and the degree of compensation provided by the temperature controlled metallic cylinder 30.

While in Fig. 1 there is shown a tubular-shaped solenoidal coil 20, the distributed capacity of which is to be controlled in accordance with temperature, it will be understood that in place of the coil 20 other devices may be utilized, such as the cylindrical tubular member 50 as shown in Fig. 2. Moreover, if desired, the length of the coil 20 shown in Fig. 1 or of the tube 50 as shown in Fig. 2 may be of critical length as a quarter wave-length, with respect to the wave-length or the frequency of the waves or oscillations developed thereon.

As the temperature is varied, it will be observed that the split cylinder 30 as shown in Figs. 1 and 2 enlarges or contracts thereby changing the spacing between itself and the coil 20 or tube 50 and hence the distributed capacity of the coil 20 or tube 50. The degree of such temperature compensation may be controlled by adjusting the position of the cylinder 30 with respect to the coil 20 or tube 50 to give the desired predetermined characteristic to the electrical system.

While the cylinder 30 has been illustrated in a preferred form, namely split lengthwise to secure free mechanical expansion and of substantially circular cross-section, it will be understood that the radially expansive metallic cylinder 30 may be of other cross-sectional configuration to vary in accordance with temperature, the capacity effect between itself and its associated element, as the coil 20 or the tube 50, spaced therefrom; and that, while a particular form of supporting means for the cylinder 30 has been illustrated in Fig. 2, any suitable supporting and adjusting means for the cylinder 30 may be employed; and that, while the metallic coil 20 in Fig. 1 is shown supported by a coil form 10, it will be understood that a self-supporting coil or any suitable supporting and insulating means for the coil may be provided. Similarly, as to the metallic tube 50 shown in Fig. 2, any suitable supporting means may be provided. While the coil 20 of Fig. 1 and the tube 50 of Fig. 2 are shown in cylindrical form of circular cross-section, it will be understood that the metallic member, as the coil 20 or the tube 50, the capacity of which is to be influenced by the expansible thermally responsive member 30, may be of other form and cross-section and may have a length and dimensions that suit the circuit or system with which it may be operatively connected or associated.

The tube 50 of Fig. 2 having terminal conductors 52 and 54 connected at 51 and 53 with the tube 50 may, for example, form a part or parts of the length of the concentric shield in a concentric cable line and the temperature responsive cylinder 30 may form part of the current carrying conductive central core of such concentric cable line the arrangement thereby serving to control the characteristics of the line in accordance with temperature.

The coil 20 of Fig. 1 with suitable modifications may, for example, be associated with an oscillation generating system as shown in Fig. 3 or Fig. 4 to be described as follows.

Fig. 3 shows a temperature-compensated high-frequency oscillation generator 60 including a space discharge vacuum tube 62 having a grid element 64, a cathode element 66 and an anode or plate element 68. Connected in the circuit between the plate electrode 68 and the filament or cathode element 66, there is a battery 70 and a coil 72. A tunable output circuit 74 connected between the grid electrode 64 and the plate electrode 68 includes a variable condenser 76 and an inductance coil 20a. Suitable condensers 78 and 80 may be provided. While a particular type of radio frequency oscillator circuit has been shown in Fig. 3, it will be understood that other types of oscillator circuits may be provided.

The inductance coil 20a may be constructed in the manner of the coil 20 shown and described in connection with Fig. 1. A cylindrical plate 30a variably spaced from the coil 20a and adapted to vary the distributed capacity and inductance of the winding 20a in accordance with temperature change may be constructed and disposed relative to the coil 20a in accordance with the structure shown and described in connection with Fig. 1 or Fig. 2. The cylindrical plate 30a, the cathode 66, and the midpoint 90 of the coil 20a are connected together and grounded at a ground connection 92. The coil 20a in Fig. 3 being here connected in circuit with an additional frequency determining reactance device, namely the condenser 76, the reactance of which may also vary due to change of its mechanical dimensions with change in temperature, the cylindrical plate 30a may be adjusted to compensate for the combined effect produced by the coil 20a and the additional reactance 76 or other parts of the circuit, thereby maintaining the frequency of the oscillator 60 at a constant value irrespective of temperature change.

Fig. 4 shows a wave coil 20b and its associated temperature compensating means 30b employed in connection with a radio frequency oscillator 100 to stabilize the frequency of oscillations, generated thereby in accordance with the frequency characteristic of the wave coil 20b and its associated split cylinder 30b which may be disposed within the wave coil 20b and have a length sufficient to vary the capacity of the wave coil 20b. The wave coil 20b and its associated split cylinder 30b may be constructed in the manner of the coil 20 and cylinder 30 shown and described in connection with Fig. 1 and as set forth hereinafter. Such wave coil arrangement (Fig. 4) having a sharp resonance characteristic and being temperature controlled may be utilized for the purpose of frequency stabilization similar to that of a zero temperature coefficient piezo-electric quartz crystal.

It will be understood that the oscillation generator 100 may be of any type, but in the illustration shown, which is a typical oscillator circuit, there is provided a vacuum tube space discharge device 102 having a grid element 104, a cathode element 106 and a plate or anode element 108. Connected in the circuit of the plate electrode 108 and the cathode electrode 106 there may be provided an anode battery 110 and a tunable output circuit 112 consisting of a variable condenser 114 connected in parallel circuit relation with a variable coil 116. A suitable winding 118 may be coupled to the coil 116 for connection to suitable amplifiers and radiating devices. In the circuit between the grid electrode 104 and the cathode electrode 106, there is provided a resistance or radio frequency choke coil 120 and the wave coil 20b together with its cooperating temperature compensating cylinder 30b which is adapted to fix the frequency of the oscillator 100 and assume control of the frequency in view of its sharp resonance characteristics.

More particularly, the wave conductor 20b consists of a solenoidal coil wound with a suitable number of turns of wire giving the required length of conductor. The dimensions of the coil 20b as well as the number of turns of wire therein may be varied to meet the particular requirements of frequency. By varying the spacing of the cylindrical plate 30b, with respect to the wave coil 20b, the distributed capacity and to some extent the distributed inductance of the coil 20 are varied, thereby affording a convenient means of adjustment with temperature change. In the circuit system shown, the cylinder 30b is grounded at 122 but it will be understood that in other systems the cylinder 30b may be ungrounded, depending upon the particular circuit arrangement in which it is used.

The wave conductor 20b is made of sufficient length to permit a wave development thereon and has an electrical length adjustable to proper relationship with respect to the wave-length of the waves developed thereon. This adjustment is made by variations of the distance separation between the coil 20b and the cylindrical plate 30b, thereby adjusting the inductance and capacity per unit length of conductor 20b in relation to the frequency or the wave-length of the oscillations. Such a wave resonance system has a very sharp tuning characteristic and a high degree of selectivity and is substantially free of harmonics.

It will be understood that the adjustment of the electrical length of the wave coil 20b will be made to suit the particular resonance conditions required. For example, for a wave conductor as shown, the resonance condition obtains when the length of the wave conductor 20b is adjusted to an even multiple of quarter wave-lengths of the waves developed on it. However, if the wave coil 20b were to be used in a system grounded at one end, the resonance condition would obtain when the length of the conductor is adjusted to an odd multiple of quarter wave-lengths of the waves developed on it.

While the invention has been illustrated particularly in oscillatory circuits and oscillation generators as shown in Figs. 3 and 4, it will be understood that it may be adapted also in connection with amplifier circuits, detector circuits, filter circuits and concentric cable lines for example, and that, while the split cylinders 30, 30a and 30b have been shown as influencing the capacity of a coil 20 in Fig. 1, a coil 20a of Fig. 3 and a coil 20b of Fig. 4 and a metallic tube 50 of Fig. 2, it will be understood that the cylinders 30, 30a, and 30b may be adapted to influence the capacity of other conductive elements as capacity elements, or other reactance or impedance elements. Accordingly, although this invention has been described and illustrated in relation to specific arrangements, it is to be understood that it is capable of application in other organizations and is, therefore, not to be limited to the particular embodiments disclosed but only by the scope of the appended claims and the state of the prior art.

What is claimed is:

1. Temperature controlled electrical apparatus comprising metallic structure, and means including a longitudinally and non-conductively split multi-metallic hollow tubular cylinder internally disposed in spaced relation with said metallic structure and of sufficient length for controlling the capacity of said metallic structure in a selected manner in accordance with temperature change and means for slidably adjusting said cylinder axially with respect to said metallic structure.

2. Temperature controlled electrical apparatus comprising a metallic tube, and means including a metallic tubular cylinder disposed in radially variable spaced parallel relation with said metallic tube and having sufficient surface area for controlling the capacity of said metallic tube in a selected manner in accordance with temperature change and means for slidably adjusting said cylinder axially with respect to said tube.

3. Temperature controlled electrical apparatus comprising a metallic tube, and means including a longitudinally and non-conductively split multi-metallic hollow tubular cylinder disposed in radially variable spaced parallel relation with said metallic tube and having sufficient surface area for controlling the capacity of said metallic tube in a selected manner in accordance with temperature change.

4. Temperature controlled electrical apparatus comprising cylindrical shaped metallic structure of critical length with respect to the wave-length of the waves developed thereon, and means including a longitudinally and non-conductively split multi-metallic tubular cylinder disposed in radially variable spaced parallel relation with said metallic structure and having sufficient surface area for controlling the capacity of said metallic structure in a selected manner in accordance with temperature change and means for slidably adjusting said cylinder axially with respect to said metallic structure.

5. Temperature controlled electrical apparatus including a solenoidal inductance coil, and means comprising a metallic tube for controlling the distributed capacity of said coil in a selected manner in accordance with temperature change, said tube being hollow, curved substantially in the form of said coil, longitudinally split the entire length thereof to provide adjacent edge portions separated through a high impedance path, disposed axially in substantially parallel relation with said coil, having such length substantially equal to the length of said coil as to influence the distributed capacity of said coil and composed of a plurality of metals having selected different temperature coefficients of expansion thereof to radially change in shape in a predetermined manner due to changes in temperature.

6. Temperature controlled electrical apparatus including a solenoidal inductance coil of critical length with respect to the wave-length of the waves developed thereon, means including a tubular coil form disposed within said coil for supporting said coil, and means including a metallic tubular cylinder for varying the distributed capacity of said coil in a selected manner in accordance with temperature, said cylinder being hollow, longitudinally and electrically split the entire length thereof to provide adjacent edge portions separated through a high impedance path, of substantially circular cross-section, curved substantially in the form of said coil, of such substantially equal length with respect to the length of said coil as to operatively control said distributed capacity of said coil, internally disposed axially in spaced parallel relation within said coil and coil form, having a radially expansive temperature characteristic different from the coil and coil form, and composed of a plurality of metals having selected temperature coefficients of expansion different from each other whereby said cylinder radially changes in shape in a predetermined manner due to changes in temperature.

7. Temperature controlled electrical apparatus including a metallic tubular shaped member having a critical length with respect to the wave-length of the waves developed thereon, a metallic tubular cylinder disposed axially in spaced parallel relation within said tubular member for varying the capacity thereof in a selected manner in accordance with temperature, and means for slidably adjusting said cylinder axially with respect to said member, said cylinder being hollow, of substantially circular cross-section, curved substantially in the form of said tubular member, longitudinally and electrically split the entire length thereof to provide adjacent edge portions separated through a high impedance path, of such length with respect to the length of said member as to vary the distributed capacity thereof, and composed of a plurality of metals having selected different temperature coefficients of expansion whereby said cylinder radially changes in shape in a predetermined manner due to changes in temperature.

HERBERT J. SCOTT.